US010171870B2

(12) United States Patent
Beals

(10) Patent No.: US 10,171,870 B2
(45) Date of Patent: Jan. 1, 2019

(54) FORCED EXECUTION OF AUTHENTICATED CODE

(71) Applicant: DISH Technologies L.L.C., Englewood, CO (US)

(72) Inventor: William Michael Beals, Englewood, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

(21) Appl. No.: 15/394,537

(22) Filed: Dec. 29, 2016

(65) Prior Publication Data
US 2018/0184158 A1    Jun. 28, 2018

Related U.S. Application Data

(60) Provisional application No. 62/439,850, filed on Dec. 28, 2016.

(51) Int. Cl.
*H04N 21/443*    (2011.01)
*G06F 9/4401*    (2018.01)
(Continued)

(52) U.S. Cl.
CPC ......... *H04N 21/443* (2013.01); *G06F 9/4406* (2013.01); *G06F 21/52* (2013.01);
(Continued)

(58) Field of Classification Search
CPC ............. H04N 21/443; H04N 21/2541; H04N 21/42623; H04N 21/4627; H04N 21/6334;
(Continued)

(56) References Cited

U.S. PATENT DOCUMENTS 5,768,539 A    6/1998    Metz et al.
6,219,787 B1    4/2001    Brewer
(Continued)

FOREIGN PATENT DOCUMENTS

EP    1 688 834 A2    8/2006
EP    2 299 692 A1    3/2011
WO    2007/146763 A2    12/2007

OTHER PUBLICATIONS

CI Plus Specification v1.3. Content Security Extensions to the Common Interface., Jan. 14, 2011, XP055030907, Retrieved from the Internet: URL:http://www.ci-plus.com/data/ci-plus_specification_v1.3.pdf [retrieved on Jun. 25, 2012] p. 1-p. 25.
(Continued)

*Primary Examiner* — Brian T Pendelton
*Assistant Examiner* — Alan H Luong
(74) *Attorney, Agent, or Firm* — Kilpatrick Townsend & Stockton LLP

(57) ABSTRACT

Described herein are systems and methods for providing hardware based security to software applications in a television receiver. The system can include a television receiver having a trusted hardware environment that includes a security processor and a standard environment that includes an application processor. The security processor can ensure that at least a portion of the software application executed by the application processor is secure. A portion of the software application code can be placed in an interrupt service routine memory space. During execution of the software application, the security processor can security check the portion of the software application in the interrupt service routine memory space, making it trusted code. The security processor can force the application processor to execute the trusted code by triggering an interrupt. Such forced execution can
(Continued)

allow the security processor to not only ensure that code is trusted, but that it is executed.

20 Claims, 5 Drawing Sheets

(51) Int. Cl.
| | | |
|---|---|---|
| H04L 9/14 | (2006.01) | |
| H04L 9/30 | (2006.01) | |
| H04N 21/254 | (2011.01) | |
| H04N 21/4627 | (2011.01) | |
| H04N 21/426 | (2011.01) | |
| H04N 21/6334 | (2011.01) | |
| H04N 21/418 | (2011.01) | |
| H04N 21/81 | (2011.01) | |
| G06F 21/52 | (2013.01) | |

(52) U.S. Cl.
CPC ................ *H04L 9/14* (2013.01); *H04L 9/30* (2013.01); *H04N 21/2541* (2013.01); *H04N 21/4181* (2013.01); *H04N 21/4183* (2013.01); *H04N 21/42623* (2013.01); *H04N 21/42692* (2013.01); *H04N 21/4627* (2013.01); *H04N 21/6334* (2013.01); *H04N 21/8173* (2013.01)

(58) Field of Classification Search
CPC ........ G06F 21/44; G06F 21/575; G06F 21/72; H04L 9/14; H04L 9/30
USPC ....................................... 725/25, 31; 726/21
See application file for complete search history.

(56) References Cited

U.S. PATENT DOCUMENTS

| | | |
|---|---|---|
| 2002/0099948 A1 | 7/2002 | Kocher et al. |
| 2003/0030581 A1 | 2/2003 | Roy |
| 2003/0084440 A1 | 5/2003 | Lownes |
| 2003/0126400 A1 | 7/2003 | Debiez et al. |
| 2003/0219127 A1 | 11/2003 | Russ et al. |
| 2005/0226170 A1 | 10/2005 | Relan et al. |
| 2006/0107285 A1* | 5/2006 | Medvinsky .......... H04N 7/1675 725/25 |
| 2006/0161969 A1 | 7/2006 | Moreillon |
| 2006/0272022 A1 | 11/2006 | Loukianov et al. |
| 2007/0005506 A1 | 1/2007 | Candelore |
| 2007/0180464 A1 | 8/2007 | Dellow et al. |
| 2007/0294178 A1 | 12/2007 | Pinder et al. |
| 2008/0022299 A1 | 1/2008 | Le Buhan |
| 2008/0282345 A1* | 11/2008 | Beals ...................... G06F 21/51 726/21 |
| 2009/0049220 A1* | 2/2009 | Conti ...................... G06F 13/24 710/267 |
| 2009/0157936 A1* | 6/2009 | Goss ..................... G06F 1/3203 710/264 |
| 2009/0168996 A1 | 7/2009 | Candelore |
| 2009/0172806 A1* | 7/2009 | Natu ....................... G06F 21/85 726/16 |
| 2010/0169368 A1 | 7/2010 | Neill |
| 2011/0017825 A1 | 1/2011 | Beals |
| 2011/0138164 A1 | 6/2011 | Cha et al. |
| 2012/0120250 A1 | 5/2012 | Shintani et al. |
| 2012/0321080 A1 | 12/2012 | Candelore et al. |
| 2014/0282685 A1 | 9/2014 | Beals et al. |
| 2015/0040155 A1 | 2/2015 | Gutta et al. |

OTHER PUBLICATIONS

International Search Report and Written Opinion for PCT/US2017/068150 dated Feb. 22, 2018, all pages.
International Search Report and Written Opinion for PCT/US2017/062756 dated Feb. 28, 2018, all pages.
International Search Report and Written Opinion for PCT/US2017/068173 dated Mar. 9, 2018, all pages.
International Search Report and Written Opinion for PCT/US2017/068163 dated Mar. 26, 2018, all pages.
Silberschatz A. et al., "Operating System Concepts—Fourth Edition", Operating System Concepts, No. ed.4, Jan. 1, 1994, pp. 28-35, XP002328940, the whole document.
U.S. Appl. No. 15/370,927, filed Dec. 6, 2016 Non-Final Rejection dated Jul. 2, 2018, all pages.
International Search Report and Written Opinion for PCT/US2017/068167 dated Apr. 17, 2018, all pages.

\* cited by examiner

FORCED EXECUTION OF AUTHENTICATED CODE

CROSS-REFERENCES TO RELATED APPLICATIONS

This application is a nonprovisional of and claims priority to U.S. Provisional Patent Application No. 62/439,850, entitled FORCED EXECUTION OF AUTHENTICATED CODE, filed Dec. 28, 2016. This application is also related to co-pending U.S. patent application Ser. No. 15/370,927, entitled SMART CARD AUTHENTICATION DOWNLOAD, filed Dec. 6, 2016.

BACKGROUND OF THE INVENTION

Television service providers often provide television service to television subscribers through a television receiver, also referred to sometimes as a set-top box ("STB"). The television receivers execute various software applications including, for example, a user interface for interacting with the television receiver, a software application for obtaining and providing a programming guide, a software application for displaying content on a television, and a software application for providing digital video recorder ("DVR") functionality. These software features of the television receiver have the advantage of being flexible to provide functionality to the television subscriber but the disadvantage of not being very secure. Content or functionality thieves can hack television receivers to obtain unpaid-for services and content or repurpose the STB for some other use. Repurposing is a problem as STBs are often subsidized and the service provider wants to get value for the subsidy. Therefore, there is a need for more secure software functionality on a television receiver.

BRIEF SUMMARY OF THE INVENTION

Described herein are systems and methods for providing hardware based security to software applications in a television receiver. The system can include a television receiver having a trusted hardware environment that includes a security processor for executing instructions stored on a memory within the trusted hardware environment. The television receiver can also include a standard environment that includes an application processor for executing instructions stored on a memory in the standard environment. The security processor can ensure that at least a portion of the software application executed by the application processor is trusted. The instructions stored on the memory in the standard environment can cause the application processor to execute the software application that has a portion of the software application code in an interrupt service routine memory space. Meanwhile, the security processor can security check the portion of the software application in the interrupt service routine memory space. The security processor can trigger an interrupt to the application processor, which can cause the application processor to execute the portion of the software application in the interrupt service routine memory space. After execution of the portion of the software application in the interrupt service routine memory space, the application processor can resume execution of the software application at the point prior to the interrupt. If the security check fails, the security processor can perform a security action.

Optionally, the security check can include the security processor generating a hash of the portion of the software application in the interrupt service routine memory space. The security processor can also obtain a reference hash and decrypt the reference hash with a public key. The security processor can compare the generated hash with the decrypted reference hash. If the generated hash and the decrypted reference hash match, the security check can pass. If the generated hash and the decrypted reference hash do not match, the security check can fail.

Optionally, the security action can be a reboot of the television receiver. Optionally, the application processor can return a response to the security processor after execution of the portion of the software application in the interrupt service routine memory space. Optionally, the security processor can compare the response with an expected response and, if the response does not match the expected response, the security processor can perform the security action.

Optionally, the security processor can perform the security action after triggering the interrupt if the security processor does not receive a response from the application processor within a threshold period of time. Optionally, the security processor can trigger the interrupt periodically. Optionally, the security processor can trigger the interrupt randomly. Optionally, the security processor can perform the security check continuously. Optionally, the security processor can perform the security check again after execution of the portion of the software application in the interrupt service routine memory space.

Figure 1:
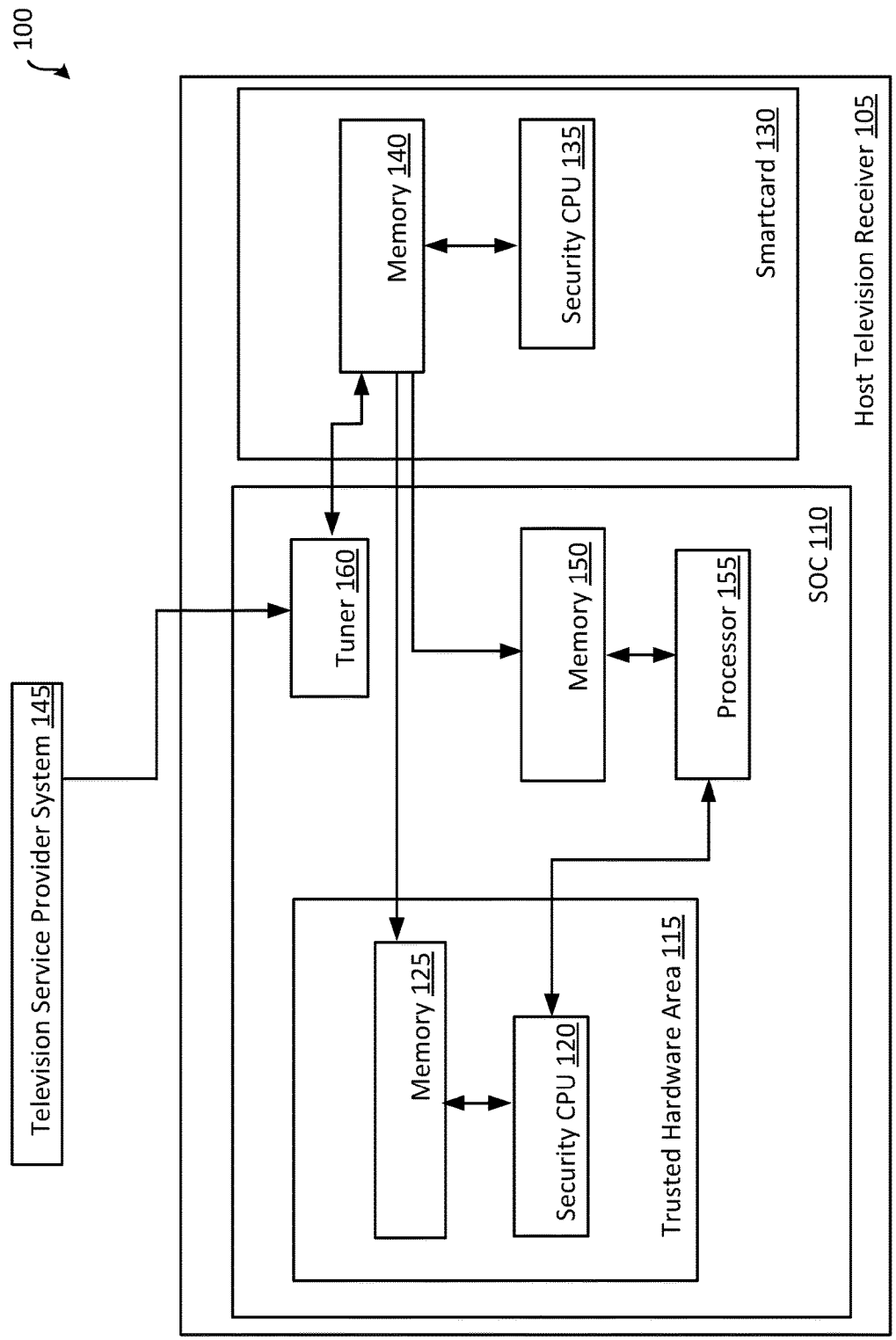
FIG. 1 illustrates a system for forcing execution of authenticated code within a television receiver.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

Television service providers often provide television service to television subscribers through a television receiver, also referred to sometimes as a set-top box ("STB"). The television receivers execute various software applications. However, software is generally prone to security vulnerabilities. Functionality and content thieves can modify software applications to cause the television receiver to provide functionality and content that is not authorized by the television service provider because, for example, the television subscriber has not paid for the content or functionality. Unscrupulous individuals can also repurpose a STB for some other use, which is a problem for television service providers because the STB is often subsidized and the television service provider wants to get value for the subsidy. Repurposing the STB can remove the ability of the television service provider to obtain that value. Many television service providers have security practices and features in place to prevent these functionality and content thieves from stealing content in transmission from the television service provider to the television receiver and within the television receiver using a smart card. Nonetheless, it has proven difficult to prevent these functionality and content thieves once the content and applications are within the standard execution environment of the television receiver because securing software applications and data is typically implemented with other software applications (e.g., antivirus software), which is similarly prone to security vulnerabilities. Scrubbing the software application using security checking by trusted hardware is possible, which provides a hardware level of security to software. Hardware security is an order of magnitude more secure than software, which can effectively prevent the functionality and content thieves from accessing unauthorized content and functionality. However, because hardware is not flexible like software, the security checking performed by the trusted hardware can often also prevent legitimate major functional changes to software features. Software applications that are completely security checked (i.e., scrubbed) by trusted hardware can return a failure when the software application is operating normally, but in a way too complex for the hardware to analyze. For example, paging functionality can cause the security scrubbing check to fail, making security checking of an entire software application by trusted hardware too rigid to work properly with the flexible software applications.

Disclosed herein are systems and methods for performing security checking of only a portion of a software application. The security checking done by the trusted hardware can effectively make the portion of the software application that was checked trusted code. The trusted hardware can then interrupt the application processor and force the application processor to run the trusted code. By ensuring a portion of the software application is trusted and executed, the level of trust of the entire software application rises similarly by extension.

FIG. 1 illustrates an embodiment of a television service system 100. The television service system 100 can include a television service provider system 145 and a television receiver 105. Television service provider system 145 can be the source of the television service and can be, for example, television service provider system 410 described in FIG. 4. Television service provider system 145 can communicate with host television receiver 105, including transmitting content and other data including software images, authorization messages, activation messages, and the like. Television service provider system 145 can communicate with television receiver 105 via any suitable network, including satellite as described in FIG. 4. The data transmitted from television service provider system 145 can be transmitted to television receiver 105 and be processed through smart card 130 for decryption and authorization. Data transmitted to television receiver 105 can be encrypted with a global network key. The global network key can help prevent signal thieves from stealing content and other data provided to television receiver 105. The authorized receiving devices (e.g., smart card 130 within television receiver 105) within television service system 100 can know the global network key.

Television receiver 105 may be configured to function as a host for a home automation system either alone or in conjunction with a communication device. Television receiver 105 may be in the form of a separate device configured to be connected with a display device, such as a television. Embodiments of television receiver 105 can include set-top boxes ("STBs"). In addition to being in the form of an STB, television receiver 105 may be incorporated as part of another device, such as a television, other form of display device, video game console, computer, mobile phone or tablet, or the like. For example, a television may have an integrated television receiver, which does not involve an external STB being coupled with the television.

Television receiver 105 can include a system on a chip ("SOC") 110 and a smart card 130. The smart card 130 can include a security central processing unit ("CPU") 135 (also referred to herein as security processor 135) and memory 140. The SOC 110 can include tuner 160, processor 155, memory 150, and trusted hardware area 115. Trusted hardware area 115 can include security CPU (or security processor) 120 and memory 125. Additionally, television receiver 105 can include one or more of the following, which are not shown: a network interface, a control processor, a tuning management processor, tuner, a network interface, an EPG database, a digital video recorder ("DVR") database, an on-demand programming database, a home automation settings database, a home automation script database, a remote control interface, and/or a descrambling engine. In other embodiments of television receiver 105, fewer or greater numbers of components may be present. It should be understood that the various components of television receiver 105 may be implemented using hardware, firmware, software, and/or some combination thereof.

Figure 4:
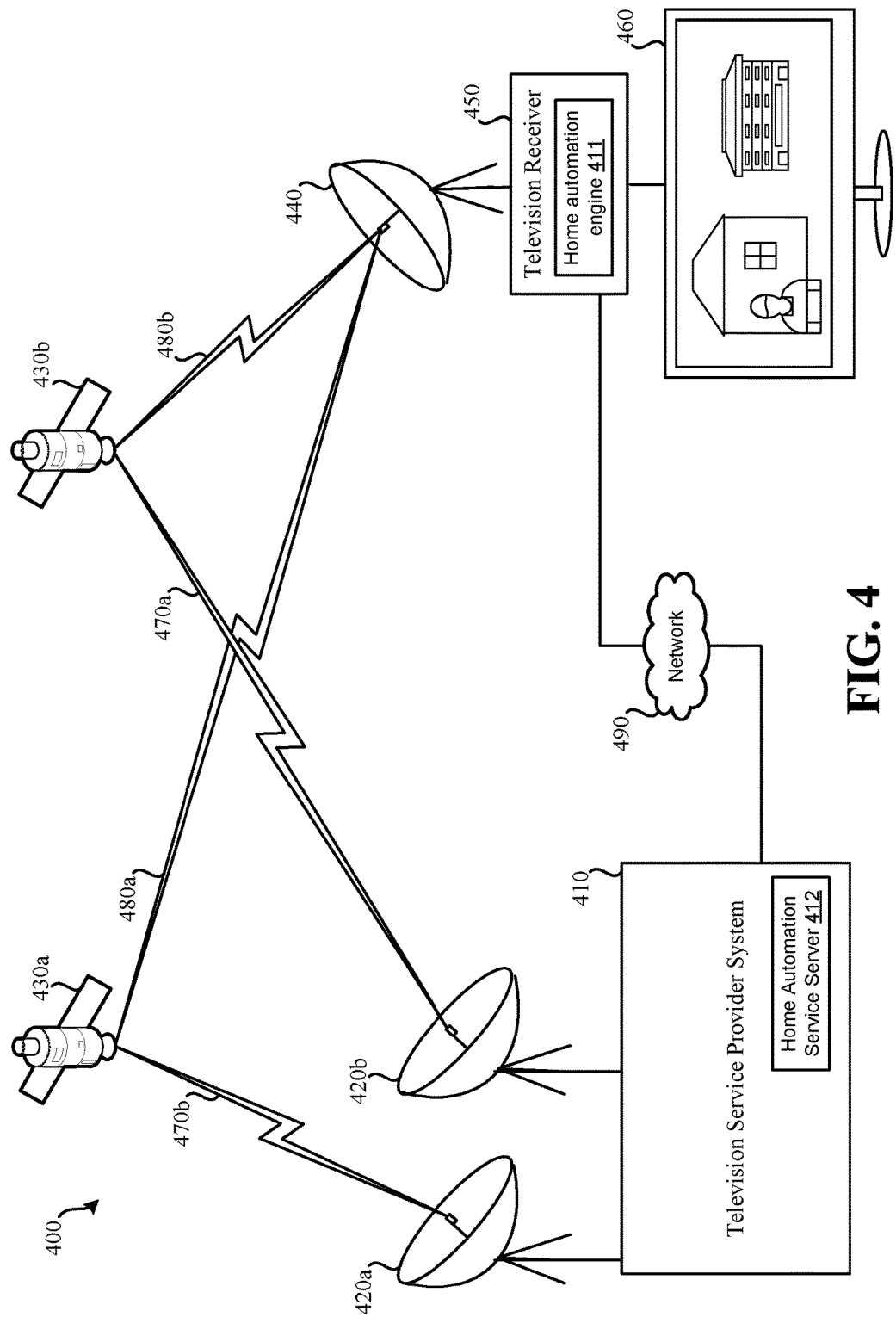
FIG. 4 illustrates an embodiment of a television service provider system.

Television receiver 105 can be, for example, television receiver 450 described in FIG. 4. Television receiver 105 can include a receiving slot into which smart card 130 can be inserted. The receiving slot can include, for example, contact points (not shown) or any other suitable coupling mechanism. Smart card 130 can include contact points (not shown) that line up with the contact points within television receiver 105 such that when smart card 130 is inserted into television receiver 105, a communication link between smart card 130 and television receiver 105 can be created. Any suitable coupling mechanism between smart card 130 and television receiver 105 can be used, such as a male-to-female socket. Optionally, smart card 130 can be a removable or a non-removable device within television receiver 105. While only one television receiver 105 is depicted in FIG. 1, any number (tens, hundreds, thousands) of television receivers 105 can receive broadcasts from television service provider system 145 as part of the television service system 100.

Smart card 130 can be any suitable smart card. Smart card 130 can be provided to the television subscriber by, for example, a television service provider. Smart card 130 can be trusted because smart card 130 is designed to handle only security. As such, memory 140 and security CPU 135 are trusted hardware. Further, if security on smart card 130 is compromised, smart card 130 can be replaced without replacing the entire television receiver 105. Memory 140 can include, for example, instructions that the security CPU 135 can execute to perform various functions specific to smart card 130. For example, memory 140 can include instructions to decrypt data sent from television service provider system 145 using a global network key, which can be stored within memory 140.

SOC 110 can include tuner 160, processor 155, memory 150, and trusted hardware area 115. Trusted hardware area 115 can include memory 125 and security CPU 120. Security CPU 120 can be any suitable processor (i.e., CPU) configured to execute only trusted instructions stored on memory 125. Memory 125 can include, for example, instructions that security CPU 120 can execute to perform various functions specific to television receiver 105. For example, memory 125 can include instructions to decrypt data sent from smart card 130. Memory 125 can also store instructions that cause security CPU 120 to perform a security check on specific memory regions of memory 150. Memory 125 can also store instructions that cause security CPU 120 to send an interrupt to processor 155. Memory 125 can be any size memory.

Tuner 160 may include one or more tuners used to tune to transponders that include broadcasts of one or more television channels or transmission of other data, such as software images. Such tuners may be used also to receive for storage on-demand content and/or addressable television commercials. In some embodiments, two, three, or more than three tuners may be present, such as four, six, or eight tuners. Each tuner contained in tuner 160 may be capable of receiving and processing a single transponder stream from a satellite transponder or from a cable network at a given time. As such, a single tuner may tune to a single transponder stream at a given time. If tuner 160 includes multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuner 160 may be used to receive the signal containing the multiple television channels for presentation and/or recording. Tuner 160 may receive commands from a tuning management processor (not shown), which can instruct tuner 160 to which frequencies are to be tuned.

Processor 155 can be any suitable processor (i.e., CPU) configured to execute instructions stored on memory 150. The area in which processor 155 and memory 150 reside is not as trusted as trusted hardware area 115. This is at least partially because processor 155 and memory 150 are not secured like security CPU 120 and memory 125 within trusted hardware area 115. Memory 150 can include instructions for performing various functions of television receiver 105. These instructions can include various software applications as discussed herein. As another example, memory 150 can include instructions for receiving an interrupt from security CPU 120. Memory 150 can be any size memory.

In use, data transmitted to television receiver 105 from television service provider system 145 can be encrypted with a global network key. This global network key system can prevent signal thieves from stealing content and other data provided to television receiver 105. For signature verification purposes, the smart card 130 within television receiver 105 on the television service system 100 can know the global public signature key to verify signatures, but does not have the global private signature key, so not even a compromised smart card can sign data for other devices since it does not have the global private signature key. The smart card 130 can perform various checks to confirm that the data is intended for the television receiver 105, that it is not corrupt, and that it has come from a trusted source. For example, the smart card 130 can use a cryptographic hashing algorithm to generate a hash of the data. The generated hash can be compared with a reference hash that is obtained from the television service provider and encrypted with the global private signature key. The smart card can decrypt the reference hash with the corresponding global public signature key and compare the reference hash with the generated hash. If the reference hash matches the generated hash, the security checks can pass. The smart card 130 can then encrypt and transmit the data to the memory 150 or memory 125, depending on the type of data. Various signature and encryption methods are used until this point to ensure the data transmitted from television service provider 145 is secure all through the network and system until it reaches the memory 150 of television receiver 105. Once in the standard execution environment (e.g., memory 150) the software applications could be subject to hacking by content and functionality thieves. The systems and methods described in FIGS. 2 and 3 can thwart these thieves. For software applications transmitted and/or stored in memory 150, processor 155 can execute the software applications as described in more detail herein.

Figure 2:
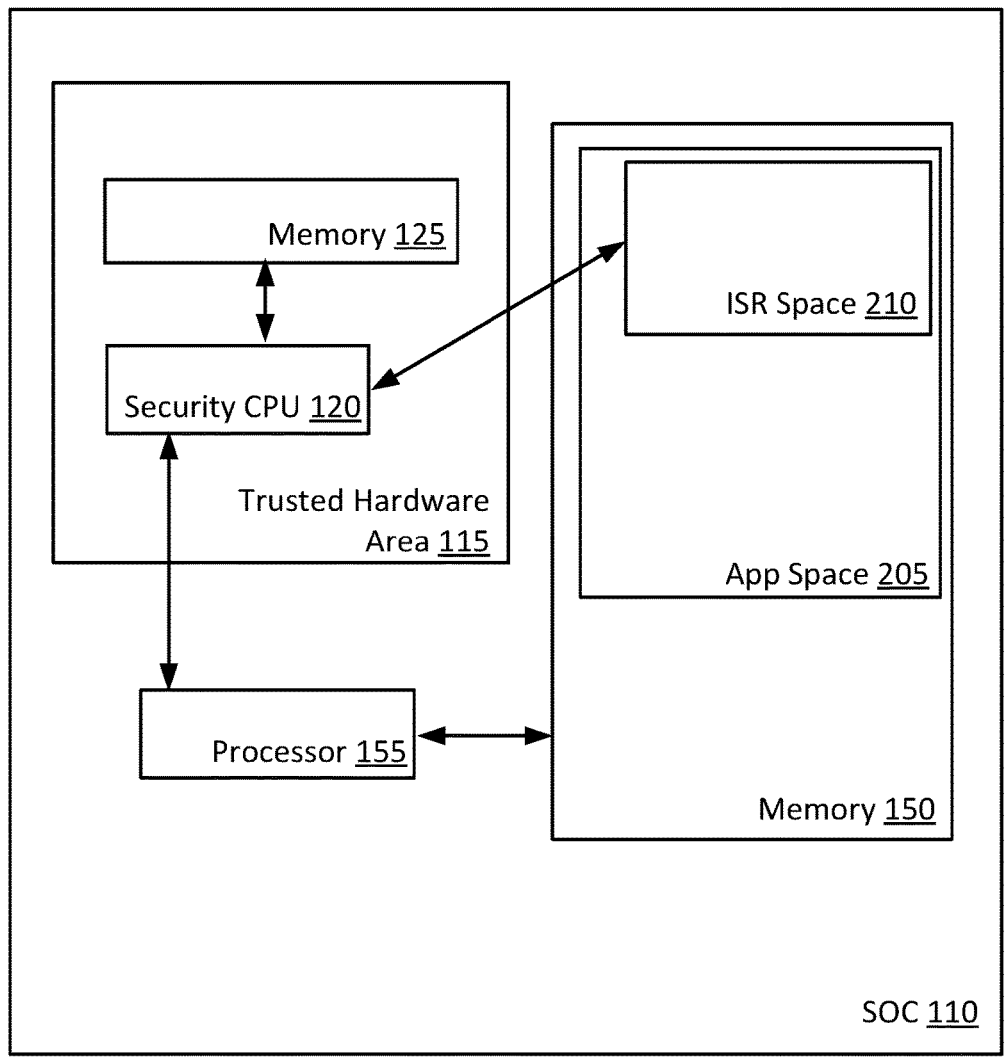
FIG. 2 illustrates a method for forcing execution of authenticated code within a television receiver.

FIG. 2 illustrates a more detailed view of SOC 110. SOC 110 can include memory 150, processor 155, and trusted hardware area 115, as described above. Within memory 150, there can be application memory space 205 as well as interrupt service routine ("ISR") memory space 210. Application memory space 205 can be a memory space within memory 150 in which software applications can be stored. ISR space 210 can be the location specified and known by processor 155 for execution if an interrupt is triggered.

In use, a software application can be stored in memory 150 at application space 205. A portion of the software application can be stored at ISR space 210. The portion of the software application stored at ISR space 210 can be, for example, a security verifier portion of the software application. Processor 155 can execute the software application. Meanwhile, security CPU 120 can perform a security check on the instructions in ISR space 210 (i.e., the portion of the software application stored in ISR space 210). The security check can include calculating a hash of the portion of the software application stored in ISR space 210. The hash can be calculated using any suitable cryptographic hashing algorithm. The security check can further include obtaining a reference hash that has been encrypted with a private signature key managed by the television service provider. The television service provider 145 can generate the reference hash prior to providing the software application to the television receiver 105 and also encrypt the reference hash, providing the public key to the television receiver 105. The security check can further include decrypting the reference hash and comparing the decrypted reference hash with the generated hash. By comparing the decrypted reference hash to the generated hash, the security CPU 120 can confirm that the portion of the software application that is expected to be stored in ISR space 210 is exactly the same as the reference software originally signed by the television service provider 145 before being sent to the television receiver 105. If the decrypted reference hash does not match the generated hash, the security check can fail. If the security check fails, the security CPU 120 can execute a security action. The security action can be, for example, rebooting the television receiver 105. Though there may be innocent reasons for the security check to fail, this security check can confirm that a content or functionality thief is not tampering with the software application or the memory spaces of memory 150.

If the decrypted reference hash matches the generated hash, the security check can pass. The security CPU 120 can continuously security check the portion of the software application that is in the ISR space 210. For continuous checking, security CPU 120 can optionally wait a short period of time and repeat the security check. Security CPU 120 can continue this checking process repeatedly until the security check fails or the software application is no longer executed by the processor 155. Alternatively, the security CPU 120 can security check the portion of the software application that is in the ISR space 210 once, and upon completion, trigger an interrupt. If the security CPU 120 continuously performs the security check, the security CPU 120 can trigger the interrupt continuously, periodically, or randomly. As an example of periodic triggering, the interrupts can be triggered every 60 seconds. As an example of random triggering, the interrupts can be triggered a number of seconds apart that is selected by a random number generator. As an example of continuous triggering, the interrupts can be triggered on a regular basis and the timing between interrupts can be randomized slightly (e.g., The interrupts are triggered every 1 minute with an up to 5 second variation between interrupts that is selected by a random number generator).

Upon trigger of the interrupt, the processor 155 can pause execution of the software application in application space 205 and execute the portion of the software application in the ISR space 210. The portion of the software application in the ISR space 210 can be security verifier code that, for example, executes a calculation and returns the result as a response. Because the security CPU 120 has security checked (either continuously or just before triggering the interrupt) the security verifier code, the security verifier code can be trusted code. As trusted code, the security CPU can expect a specific response from the security verifier code. Optionally, the portion of the software application in the ISR space 210 can be any code, but because the code has been security checked, it is trusted code. As such, the security CPU expects to trust the response. The response can be sent by processor 155 to security CPU 120. Security CPU 120 can compare the response to an expected response stored in memory 125. If the calculated response matches the expected response, the security CPU 120 can determine that the verifier passed. If the calculated response does not match the expected response, the security CPU 120 can determine the verifier failed. If the security CPU 120 determines that the verifier failed, the security CPU 120 can execute the security action.

The security check in conjunction with the security verifier can confirm that the software application has not been tampered with. In this way, these checks can be thought of as anti-virus software for the software application. One way in which the functionality and content thieves can attempt to thwart the security check and security verifier can be to disable interrupts. However, once the interrupt is triggered by security CPU 120, security CPU 120 can expect a result returned. If the result is not returned within a threshold period of time, the security CPU 120 can determine that there is an issue and execute the security action.

The security action can be, for example, a reboot of the television receiver 105. Rebooting the television receiver 105 can serve to thwart any content and functionality thieves without completely disabling the television receiver 105. Optionally, a counter can be stored in memory 125 that tracks the number of times a security action was triggered. After a threshold number of security actions, particularly within a threshold period of time, the security CPU 120 can determine that the television receiver is likely being hacked and disable the entire television receiver 105.

Once the response to the security CPU 120 is processed, the processor 155 can resume execution of the software application. In some embodiments, the security action can terminate the execution of the software application. In some embodiments, the security action can be a reboot and the processor 155 can restart execution of the software application after reboot.

Figure 3:
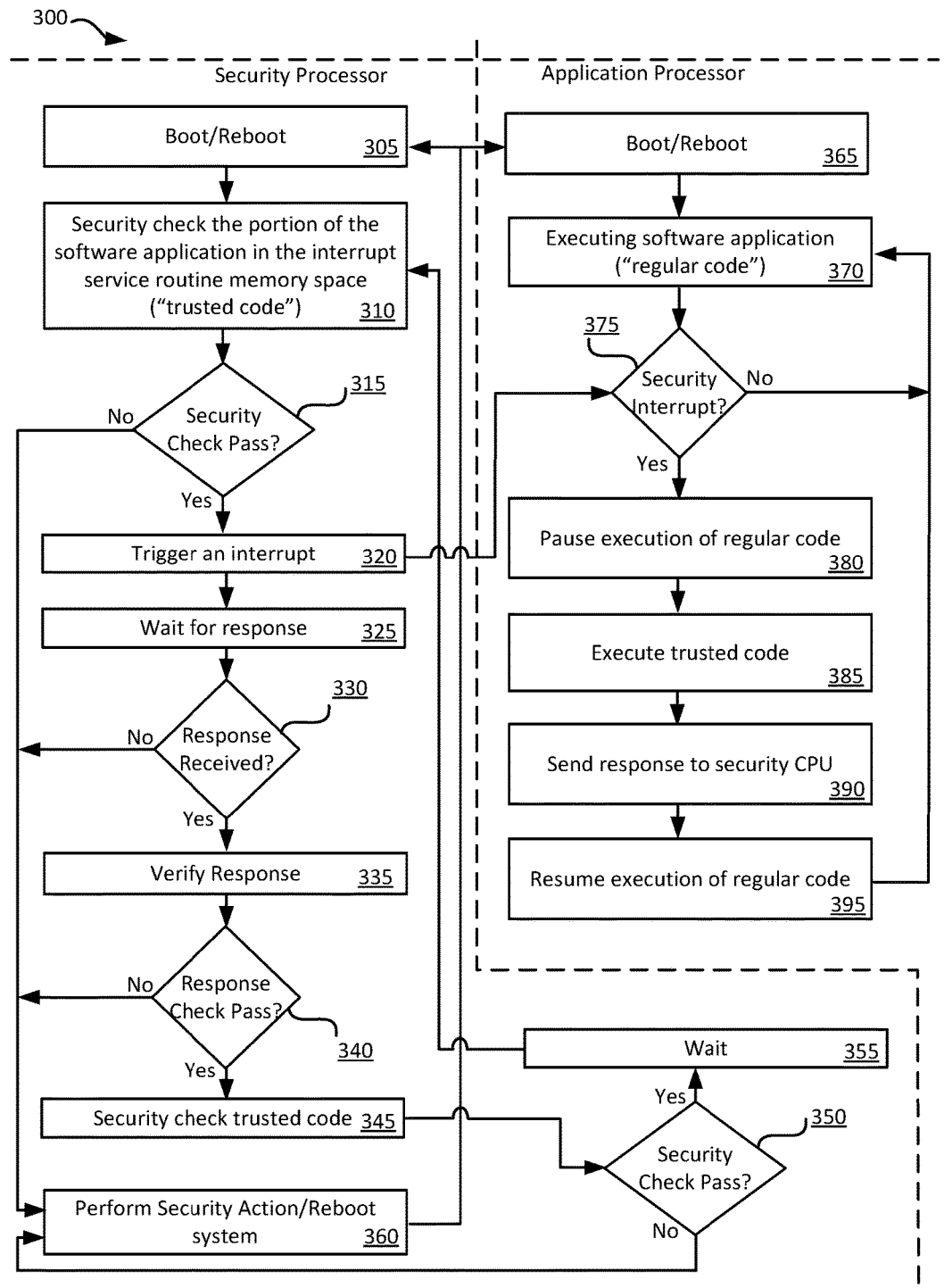
FIG. 3 illustrates another method for forcing execution of authenticated code within a television receiver.

FIG. 3 illustrates a block-flow diagram 300 process for forcing execution of trusted code on a television receiver. The security processor portion of the diagram 300 can be performed by, for example, security CPU 120 of FIGS. 1 and 2. The application processor portion of the diagram 300 can be performed by, for example processor 155 of FIGS. 1 and 2. As seen in FIG. 3, the functionality of the security processor and the application processor work together to create a more secure application execution environment. The flow of the diagram 300 can begin at 305 for the security processor and 365 for the application processor with a boot/reboot of the processor. For example, the process 300 can initiate with the television receiver being powered on (i.e., booting up) or after a reboot because, for example, the security action was performed. Following boot/reboot, on the application processor side, the application processor can execute the software application at 370. A portion of the software application can be located at the interrupt service routine ("ISR") memory space. The portion of the software application in the ISR memory space will be referred to as trusted code, as explained herein. An ISR memory space is a known memory location that the application processor executes when an interrupt is triggered. The remaining portion of the software application will be referred to as regular code. At 370, the application processor can execute the regular code. Following boot/reboot, on the security processor side, the security processor can security check the portion of the software application in the ISR memory space at 310. Because the security processor is security checking that portion of the software application, that portion of the software application is referred to as trusted code. It can be trusted because the security processor verifies its authenticity as described herein.

At 310, the security check can include, for example, generating a hash of the portion of the software application in the ISR memory space. The hash can be generated with any suitable cryptographic hashing algorithm. The security processor can compare the generated hash with a reference hash, which can be stored in memory in the trusted hardware area of the television receiver with the security processor. Before comparing the generated hash and the reference hash, the reference hash can be decrypted using a public key. If the generated hash matches the decrypted reference hash, the security check can pass. If the generated hash does not match the decrypted reference hash, the security check can fail. At 315 the security processor can determine whether the security check failed. If the security check passed, the security processor can trigger an interrupt at 320, which is described further below. If the security check failed, at 360 the security processor can perform a security action. The security action can be, for example, rebooting the television receiver.

After the security check has been executed at least one time, the security processor can trigger an interrupt at 320. Triggering the interrupt can cause the application processor to determine whether interrupts are enabled and/or whether it received an interrupt. If interrupts are not enabled or an interrupt was not received at 375, the application processor will continue execution of the software application at 370. If interrupts are enabled, the application processor can pause execution of the software application regular code at 380. The application processor can determine if the interrupt was a security interrupt and if so, execute the portion of the software application in the ISR memory space (i.e., the trusted code) at 385. If the application processor determines that the interrupt was not a security interrupt, all other interrupts can be executed as regular code. Stated differently, interrupts other than security interrupts will not execute the trusted code in the ISR memory space. The execution of the trusted code will happen because the location of the ISR memory space is known and the application processor will automatically execute the instructions at that memory location when an interrupt is triggered. At 390, the application processor can return a response to the security processor. The response to return can be coded into the trusted code. After completion of the ISR instructions (i.e., the trusted code), the application processor can resume execution of the regular code at 395, returning to the state shown at 370.

Back at the security processor, after triggering the interrupt, the security processor waits for a response at 325. At 330, the security processor can determine whether a response was received. If an interrupt was not received at 375 as determined by the application processor, a response will not be sent by the application processor at 390. This can happen for reasons, such as, interrupts being disabled. The security processor can know that after an interrupt is triggered at 320, within a threshold period of time a response is expected, so the wait at 325 can be for a known period. If the response is not received in that threshold period of time as determined at 330, the security processor can perform the security action at 360. If the response was received, the security processor can optionally verify the response at 335. The response verification can be, for example, comparing an expected response against the received response. If the expected response matches the received response, the response check can pass. If the response check failed at 340, the security processor can perform the security action at 360. If the response check passed at 340, the security processor can security check the trusted code at 345. The security check can be the same as described with respect to 310. At 350, the security processor can again determine if the security check passed, as it did at 315. If the security check failed, the security processor can perform the security action at 360. If the security check passed, the security processor can wait at 355 for a specified time and, after the wait, begin the process again with security checking the trusted code at 310.

Note that at any time during the process 300 that the security action 360 is performed, which can be a reboot, the security processor and application processor reboot and begin again at 305 and 365 respectively. Note also that this process ensures that as long as the security check of the trusted code passes, the code remains trusted. A failure of the security check indicates that the trusted code may have been modified. Forcing the execution of the trusted code can alert the security processor to interrupts being disabled, which can also indicate that there has potentially been inappropriate activity by signal or functionality thieves. Further, the trusted code can be code that can serve to verify the remaining software application. For example, the trusted code can be code that verifies the authenticity of other portions of the software application. The ability to scrub code portions of code to make the code trusted outside the trusted hardware area in addition to having the ability to force execution of that trusted code can allow the television service provider to make an otherwise vulnerable software application much more secure.

FIG. 4 illustrates an embodiment of a satellite television distribution system 400. While a home automation system may be incorporated with various types of television receivers, various embodiments may be part of a satellite-based television distribution system. Cable, IP-based, wireless, and broadcast focused systems are also possible. Satellite television distribution system 400 may include: television service provider system 410, satellite transmitter equipment 420, satellites 430, satellite dish 440, television receiver 450, home automation service server 412, and display device 460. The display device 460 can be controlled by, for example, a user using a remote control device that can send wired or wireless signals to communicate with the television receiver 450 and/or display device 460. Alternate embodiments of satellite television distribution system 400 may include fewer or greater numbers of components. While only one satellite dish 440, television receiver 450, and display device 460 (collectively referred to as "user equipment") are illustrated, it should be understood that multiple (e.g., tens, thousands, millions of) instances and types of user equipment may receive data and television signals from television service provider system 410 via satellites 430.

Television service provider system 410 and satellite transmitter equipment 420 may be operated by a television service provider. A television service provider may distribute television channels, on-demand programming, programming information, and/or other content/services to users. Television service provider may also distribute software updates for television receiver 450. Television service provider system 410 may receive feeds of one or more television channels and content from various sources. Such television channels may include multiple television channels that contain at least some of the same content (e.g., network affiliates). To distribute television channels for presentation to users, feeds of the television channels may be relayed to user equipment via multiple television distribution satellites. Each satellite may relay multiple transponder streams. Satellite transmitter equipment 420 may be used to transmit a feed of one or more television channels from television service provider system 410 to one or more satellites 430. While a single television service provider system 410 and satellite transmitter equipment 420 are illustrated as part of satellite television distribution system 400, it should be understood that multiple instances of transmitter equipment may be used, possibly scattered geographically, to communicate with satellites 430. Such multiple instances of satellite transmitting equipment may communicate with the same or with different satellites. Different television channels may be transmitted to satellites 430 from different instances of transmitting equipment. For instance, a different satellite dish of satellite transmitter equipment 420 may be used for communication with satellites in different orbital slots.

Satellites 430 may be configured to receive signals, such as streams of television channels or other data including software images for updating various television receivers, from one or more satellite uplinks such as satellite transmitter equipment 420. Satellites 430 may relay received signals from satellite transmitter equipment 420 (and/or other satellite transmitter equipment) to multiple instances of user equipment via transponder streams. Different frequencies may be used for uplink signals 470 from downlink signals 480. Satellites 430 may be in geosynchronous orbit. Each of the transponder streams transmitted by satellites 430 may contain multiple television channels transmitted as packetized data. For example, a single transponder stream may be a serial digital packet stream containing multiple television channels. Therefore, packets for multiple television channels may be interspersed. Further, information used by television receiver 450 for home automation functions may also be relayed to a television receiver via one or more transponder streams. Further still, software images used to update television receiver 450 can be relayed to television receiver 450 via one or more transponder streams.

Multiple satellites 430 may be used to relay television channels or any other data such as information used for home automation or software images used to update television receiver 450 from television service provider system 410 to satellite dish 440. Different television channels may be carried using different satellites. Different television channels may also be carried using different transponders of the same satellite; thus, such television channels may be transmitted at different frequencies and/or different frequency ranges. As an example, a first and second television channel may be relayed via a first transponder of satellite 430a. A third, fourth, and fifth television channel may be relayed via a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 440 may be a piece of user equipment that is used to receive transponder streams from one or more satellites, such as satellites 430. Satellite dish 440 may be provided to a subscriber for use on a subscription basis to receive television channels provided by the television service provider system 410, satellite transmitter equipment 420, and/or satellites 430. Satellite dish 440, which may include one or more low noise blocks ("LNBs"), may be configured to receive transponder streams from multiple satellites and/or multiple transponders of the same satellite. Satellite dish 440 may be configured to receive television channels via transponder streams on multiple frequencies. Based on the characteristics of television receiver 450 and/or satellite dish 440, it may only be possible to capture transponder streams from a limited number of transponders concurrently. For example, a tuner of television receiver 450 may only be able to tune to a single transponder stream from a transponder of a single satellite at a given time. The tuner can then be re-tuned to another transponder of the same or a different satellite. A television receiver 450 having multiple tuners may allow for multiple transponder streams to be received at the same time.

In communication with satellite dish 440 may be one or more television receivers. Television receivers may be configured to decode signals received from satellites 430 via satellite dish 440 for output and presentation via a display device, such as display device 460. A television receiver may be incorporated as part of a television or may be part of a separate device, commonly referred to as a set-top box ("STB"). Television receiver 450 may decode signals received via satellite dish 440 and provide an output to display device 460. On-demand content, such as PPV content, may be stored to a computer-readable storage medium. FIG. 1 provides additional detail of various embodiments of a television receiver. A television receiver is defined to include STBs, and also circuitry having similar functionality that may be incorporated with another device. For instance, circuitry similar to that of a television receiver may be incorporated as part of a television. As such, while FIG. 4 illustrates an embodiment of television receiver 450 as separate from display device 460, it should be understood that, in other embodiments, similar functions may be performed by a television receiver integrated with display device 460. Television receiver 450 may include home automation engine 411.

Display device 460 may be used to present video and/or audio decoded and output by television receiver 450. Television receiver 450 may also output a display of one or more interfaces to display device 460, such as an electronic programming guide ("EPG"). In many embodiments, display device 460 is a television. Display device 460 may also be a monitor, computer, or some other device configured to display video and, possibly, play audio.

Uplink signal 470a represents a signal between satellite transmitter equipment 420 and satellite 430a. Uplink signal 470b represents a signal between satellite transmitter equipment 420 and satellite 430b. Each of uplink signals 470 may contain streams of one or more different television channels. For example, uplink signal 470a may contain a first group of television channels, while uplink signal 470b contains a second group of television channels. Each of these television channels may be scrambled such that unauthorized persons are prevented from accessing the television channels. Uplink signals 470 can also contain other data as described herein, such as software images for updating television receiver 450.

Downlink signal 480a represents a signal between satellite 430a and satellite dish 440. Downlink signal 480b represents a signal between satellite 430b and satellite dish 440. Each of downlink signals 480 may contain one or more different television channels, which may be at least partially scrambled. A downlink signal may be in the form of a transponder stream. A single transponder stream may be tuned to at a given time by a tuner of a television receiver. For example, downlink signal 480a may be a first transponder stream containing a first group of television channels, while downlink signal 480b may be a second transponder stream containing a different group of television channels. In addition to or instead of containing television channels, a transponder stream can be used to transmit on-demand content to television receivers, including PPV content, which may be stored locally by the television receiver until output for presentation. Further, a transponder stream can contain other data as described herein, such as software images for updating television receiver 450.

FIG. 4 illustrates downlink signal 480a and downlink signal 480b, being received by satellite dish 440 and distributed to television receiver 450. For a first group of television channels, satellite dish 440 may receive downlink signal 480a and for a second group of channels, downlink signal 480b may be received. Television receiver 450 may decode the received transponder streams. As such, depending on which television channels are desired to be presented or stored, various transponder streams from various satellites may be received, descrambled, and decoded by television receiver 450. Further, television receiver 450 can control content as described in more detail in FIG. 1.

Network 490, which may include the Internet, may allow for bidirectional communication between television receiver 450 and television service provider system 410, such as for home automation related services provided by home automation service server 412. Although illustrated as part of the television service provider system, the home automation service server 412 may be provided by a third party in embodiments. In addition or in alternate to network 490, a telephone, e.g., landline, or cellular connection may be used to enable communication between television receiver 450 and television service provider system 410.

Figure 5:
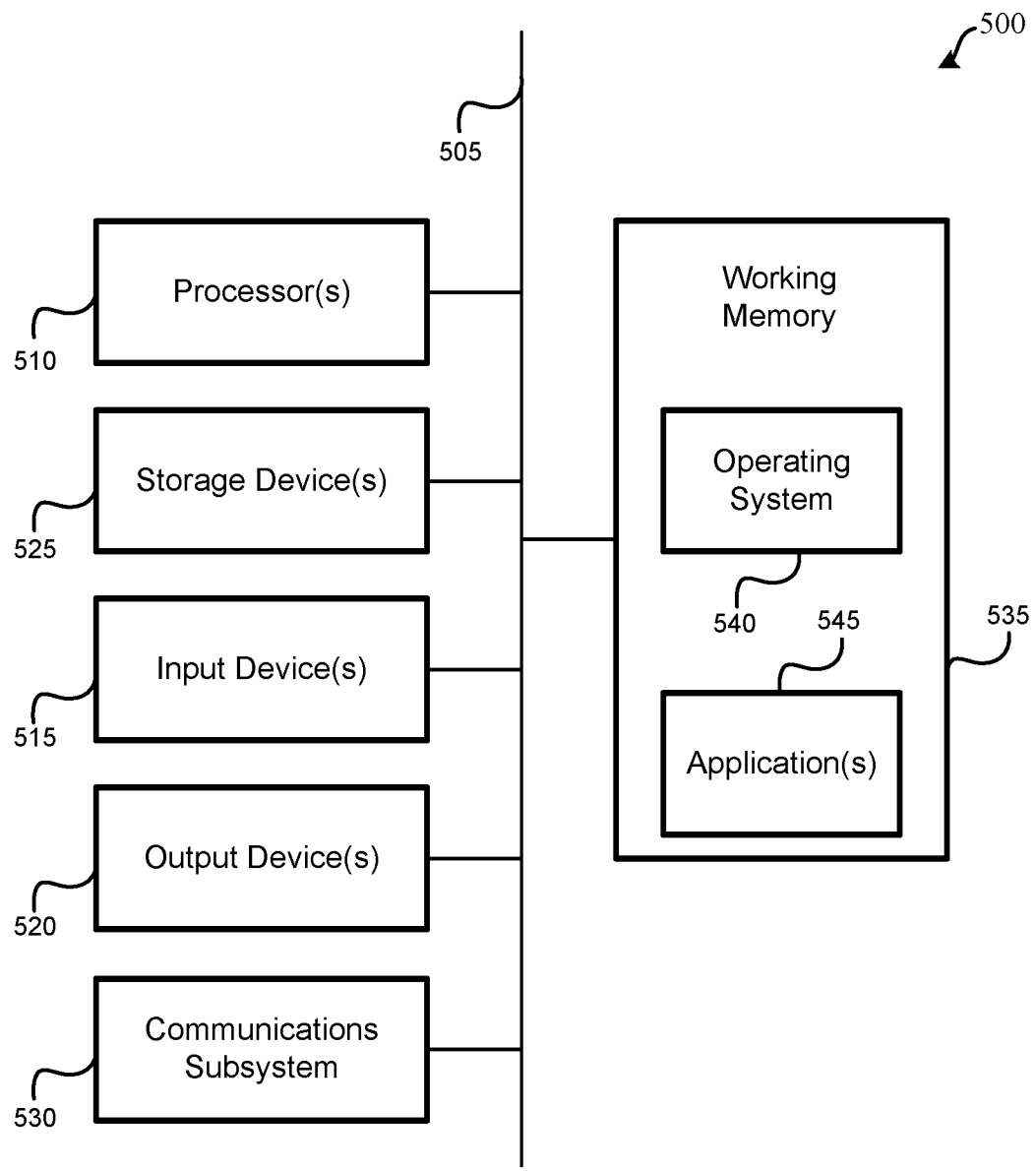
FIG. 5 illustrates an embodiment of a computer system.

FIG. 5 illustrates an embodiment of a computer system 500. A computer system 500 as illustrated in FIG. 5 may be incorporated into devices such as a television receiver (e.g., host television receiver 105 of FIG. 1), DVR, television, media system, personal computer, and the like. FIG. 5 provides a schematic illustration of one embodiment of a computer system 500 that can perform some or all of the steps of the methods provided by various embodiments. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505, or may otherwise be in communication, as appropriate. The hardware elements may include one or more processors 510 (e.g., security CPU 120, security CPU 175 and/or security CPU 135 of FIG. 1), including without limitation one or more general-purpose processors and/or one or more special-purpose processors such as digital signal processing chips, graphics acceleration processors, and/or the like; one or more input devices 515, which can include without limitation a mouse, a keyboard, a camera, a remote control, and/or the like; and one or more output devices 520, which can include without limitation a display device, a printer, and/or the like.

The computer system 500 may further include and/or be in communication with one or more non-transitory storage devices 525 (e.g., memory 140 and/or memory 125 of FIG. 1), which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 500 might also include a communications subsystem 530, which can include without limitation a modem, a network card (wireless or wired), an infrared communication device, a wireless communication device, and/or a chipset such as a Bluetooth® device, an 802.11 device, a Wi-Fi device, a WiMax device, cellular communication facilities, etc., and/or the like. The communications subsystem 530 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 530. In other embodiments, a portable electronic device, may be incorporated into the computer system 500 (e.g., an electronic device or STB), as an input device 515. In many embodiments, the computer system 500 will further comprise a working memory 535, which can include a RAM or ROM device, as described above. Memory 125 of FIG. 1 can include a working memory.

The computer system 500 also can include software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 2 or 3, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code might be stored on a non-transitory computer-readable storage medium, such as the storage device(s) 525 described above. In some cases, the storage medium might be incorporated within a computer system, such as computer system 500. In other embodiments, the storage medium might be separate from a computer system (e.g., a removable medium), such as a compact disc, and/or provided in an installation package, such that the storage medium can be used to program, configure, and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 500 to perform methods in accordance with various embodiments of the technology. According to a set of embodiments, some or all of the procedures of such methods are performed by the computer system 500 in response to processor 510 executing one or more sequences of one or more instructions, which might be incorporated into the operating system 540 and/or other code, such as an application program 545, contained in the working memory 535. Such instructions may be read into the working memory 535 from another computer-readable medium, such as one or more of the storage device(s) 525. Merely by way of example, execution of the sequences of instructions contained in the working memory 535 might cause the processor(s) 510 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 500, various computer-readable media might be involved in providing instructions/code to processor(s) 510 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 525. Volatile media include, without limitation, dynamic memory, such as the working memory 535.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500.

The communications subsystem 530 and/or components thereof generally will receive signals, and the bus 505 then might carry the signals and/or the data, instructions, etc. carried by the signals to the working memory 535, from which the processor(s) 510 retrieves and executes the instructions. The instructions received by the working memory 535 may optionally be stored on a non-transitory storage device 525 either before or after execution by the processor(s) 510.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method, comprising:
    executing, by an application processor in a television receiver, a software application comprising software application code, wherein a first portion of the software application code resides in an interrupt service routine memory space and execution of the first portion of the software application code generates a result, and wherein executing the software application comprises executing a second portion of the software application code;
    security checking, by a security processor in the television receiver, the first portion of the software application code in the interrupt service routine memory space, wherein the security processor is not the application processor;
    after security checking the first portion of the software application code, triggering, by the security processor, an interrupt to the application processor;
    in response to the interrupt:
        halting execution, by the application processor, of the second portion of the software application code,
        executing, by the application processor, the first portion of the software application code in the interrupt service routine memory space,
        after executing the first portion of the software application code in the interrupt service routine memory space, transmitting, by the application processor, the result to the security processor, and
        after transmitting the result to the security processor, continuing execution, by the application processor, of the second portion of the software application code; and
    performing, by the security processor, a security action if the security checking fails.

2. The method of claim 1, wherein the security checking comprises:
    generating, by the security processor, a hash of the first portion of the software application code in the interrupt service routine memory space;

obtaining, by the security processor, a reference hash;
decrypting, by the security processor, the reference hash with a public key;
comparing, by the security processor, the generated hash with the decrypted reference hash; and
determining, by the security processor, that the security check passed only if the generated hash matches the decrypted reference hash.

3. The method of claim 1, wherein the security action is rebooting the television receiver.

4. The method of claim 1, wherein the security action is terminating execution of the software application.

5. The method of claim 1, further comprising:
comparing, by the security processor, the result with an expected result; and
performing, by the security processor, the security action if the result does not match the expected result.

6. The method of claim 1, further comprising:
performing, by the security processor, the security action a threshold period of time after triggering the interrupt if the security processor does not receive the result from the application processor.

7. The method of claim 1, wherein the interrupt is triggered by the security processor periodically.

8. The method of claim 1, wherein the interrupt is triggered by the security processor randomly.

9. The method of claim 1, wherein the security checking is performed continuously.

10. The method of claim 1, further comprising:
in response to receiving the result, security checking, by the security processor, the first portion of the software application code in the interrupt service routine memory space again.

11. A television receiver, comprising:
a security processor;
an application processor;
a first memory storing instructions that, when executed by the application processor cause the application processor to:
execute a software application comprising software application code, wherein a first portion of the software application code resides in an interrupt service routine memory space and execution of the first portion of the software application code generates a result, and wherein executing the software application comprises executing a second portion of the software application code;
in response to an interrupt triggered by the security processor:
halt execution of the second portion of the software application code,
execute the first portion of the software application code in the interrupt service routine memory space;
after executing the first portion of the software application code in the interrupt service routine memory space, transmit the result to the security processor, and
after transmitting the result to the security processor, continue executing the second portion of the software application code; and a second memory storing instructions that, when executed by the security processor, cause the security processor to:
security check the first portion of the software application code in the interrupt service routine memory space;
after security checking the first portion of the software application code, trigger the interrupt to the application processor; and
perform a security action if the security check fails.

12. The television receiver of claim 11, wherein the instructions to security check the first portion of the software application code in the interrupt service routine memory space include instructions that, when executed by the security processor, cause the security processor to:
generate a hash of the first portion of the software application code in the interrupt service routine memory space;
obtaining a reference hash;
decrypting the reference hash with a public key;
compare the generated hash with the decrypted reference hash; and
determine that the security check passed only if the generated hash matches the decrypted reference hash.

13. The television receiver of claim 11, wherein the security action is rebooting the television receiver.

14. The television receiver of claim 11, wherein the security action is terminating execution of the software application.

15. The television receiver of claim 11, wherein the second memory includes further instructions that, when executed by the security processor, cause the security processor to:
compare the result with an expected result; and
perform the security action if the result does not match the expected result.

16. The television receiver of claim 11, wherein the second memory includes further instructions that, when executed by the security processor, cause the security processor to:
perform the security action a threshold period of time after triggering the interrupt if the security processor does not receive the result from the application processor.

17. The television receiver of claim 11, wherein the interrupt is triggered periodically.

18. The television receiver of claim 11, wherein the interrupt is triggered randomly.

19. The television receiver of claim 11, wherein the security check is performed continuously.

20. The television receiver of claim 11, wherein the second memory includes further instructions that, when executed by the security processor, cause the security processor to:
security check the first portion of the software application code in the interrupt service routine memory space in response to receiving the result from the application processor.

* * * * *